United States Patent [19]

Slater

[11] 4,187,409
[45] Feb. 5, 1980

[54] APPARATUS FOR AND METHOD OF PLASMA PRE-WELD AND POST-WELD METAL PREPARATION

[75] Inventor: Norbert G. Slater, Pascagoula, Miss.

[73] Assignees: Everett Greer; John F. Bryan, III, both of Pascagoula, Miss.; part interest to each

[21] Appl. No.: 874,737

[22] Filed: Feb. 3, 1978

Related U.S. Application Data

[63] Continuation of Ser. No. 660,211, Feb. 23, 1976, abandoned.

[51] Int. Cl.² .............................................. B23K 9/00
[52] U.S. Cl. .............................. 219/121 P; 219/137 R;
148/9.5; 219/75
[58] Field of Search ................. 219/121 P, 121 R, 75,
219/76.16, 137 R; 148/9.5

[56] References Cited

U.S. PATENT DOCUMENTS

| | | | |
|---|---|---|---|
| 3,050,616 | 8/1962 | Gage | 148/9.5 |
| 3,204,075 | 8/1965 | Browning | 219/121 P |
| 3,584,184 | 6/1971 | Tylko et al. | 219/121 P |
| 3,596,047 | 7/1971 | Maniero et al. | 219/121 P |
| 3,660,630 | 5/1972 | Sunnen et al. | 219/121 P |
| 3,928,745 | 12/1975 | Demars et al. | 219/121 P |

OTHER PUBLICATIONS

Plasma Arc Gouging of Aluminum, pp. 954–959 of "Welding Journal" Nov. 1976.

*Primary Examiner*—Bruce A. Reynolds
*Assistant Examiner*—M. H. Paschall
*Attorney, Agent, or Firm*—James B. Lake, Jr.

[57] ABSTRACT

A conventional plasma arc cutting torch in which the plasma gas passageway of a cutting tip is flared about 90 degrees outwardly, the cutting torch angle-to-work is about 45 degrees, the torch stand-off from the work is about 3/16 inch, and the torch travel speed is about 60 inches/minute to obtain metal preparation of consistent width and depth dependent on the work metal and its thickness. Changes in these characteristics, when limited to established parameters, varies the width and depth of the resulting metal preparation which remains constant for each combination of changes.

1 Claim, 2 Drawing Figures

APPARATUS FOR AND METHOD OF PLASMA PRE-WELD AND POST-WELD METAL PREPARATION

This is a continuation of application Ser. No. 660,211, filed Feb. 23, 1976, abandoned.

BACKGROUND OF THE INVENTION

1. Field of the Invention

The invention relates generally to plasma arc cutting of metals, and more particularly to pre-weld and post-weld metal preparation with plasma arc methods and apparatus.

2. Description of Prior Art

The prior art teaches cutting tips defining cylindrical plasma gas passageways of constant diameter, angling the torch to the work, and mentions without illustration or description gouging. See U.S. Pat. Nos. 3,324,277; 3,851,864; 3,436,516; 3,534,388; 3,604,889; and 3,582,604.

SUMMARY OF THE INVENTION

It is an object of the invention to provide an apparatus for and a method of making plasma arc pre-weld and post-weld metal preparation and back gouging that are consistent in width and depth

DETAILED DESCRIPTION OF THE INVENTION

Figures 1, 2:
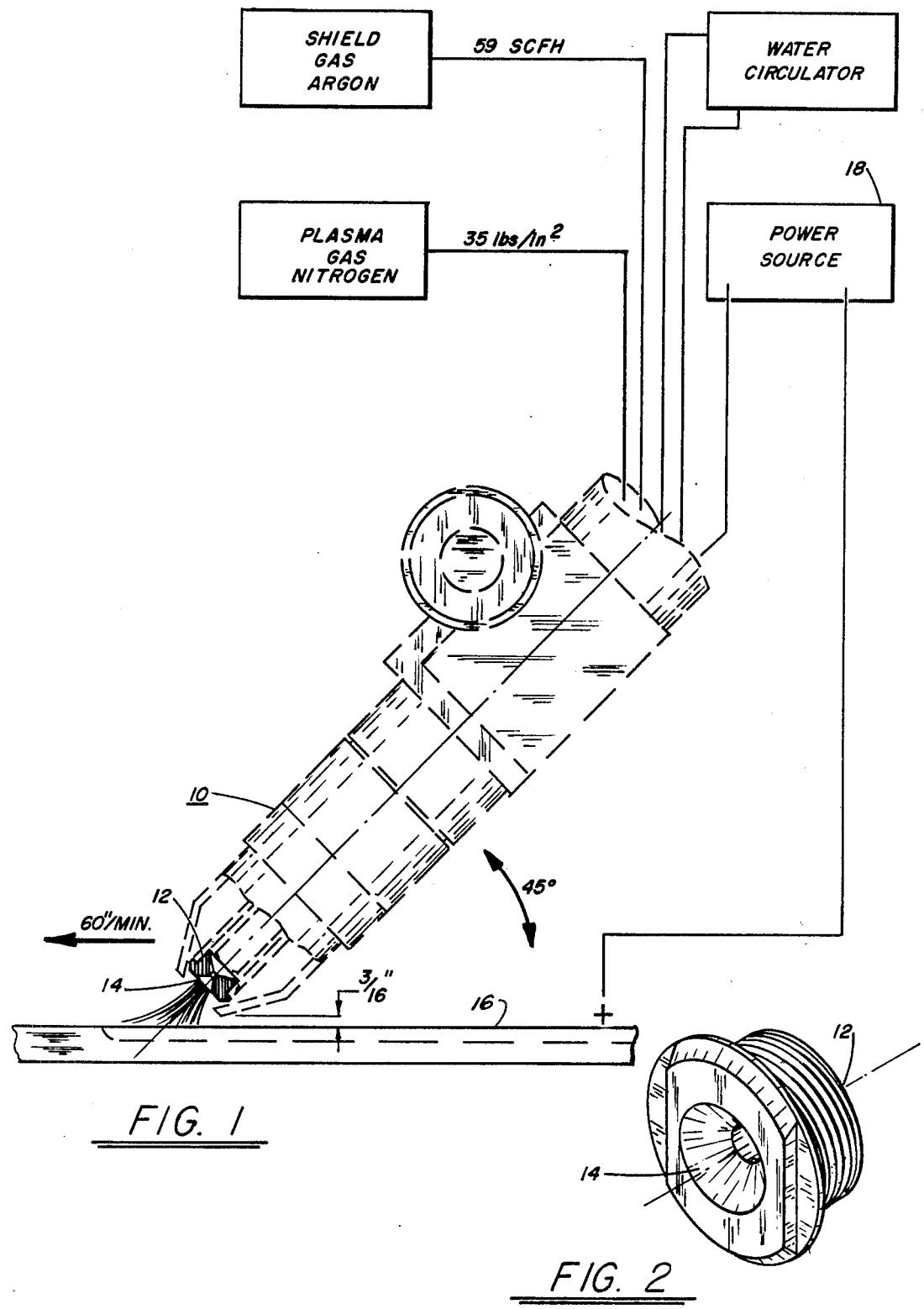
FIG. 1 is a partially diagrammatic side elevation of apparatus for the invention with torch partially cut-away to show a section cutting tip.
FIG. 2 is an enlarged isometric view of a cutting tip flared in accordance with the invention.

Referring to FIGS. 1 and 2, the invention comprises a conventional plasma arc cutting torch 10 in which the cutting tip 12 has had its plasma gas passageway 14 flared 90 degrees plus or minus 10 degress about the longitudinal center axis of said tip.

Torch 10 is carried on a conventional torch carrier (not shown), or possibly by hand, at an angle of 45 degrees plus or minus 10 degrees, with the work 16, and at a stand-off distance of 3/16 inch, plus or minus 1/16 inch and travels in the direction of the torch downward slant at a speed of 60 inches per minute to plus 90"or minus 38". A source of electrical power 18 supplies 250 amperes and is connected to make the cutting tip negative and the work 16 positive. Nitrogen at 35 pounds per square inch is supplied to the torch as a plasma gas, and argon is supplied as a shield gas at 59 stard cubic feet/-hour flow. Water is supplied in a circulating system to the torch for cooling and noise suppression.

With the numerical parameters given above metal preparation and gouges are made ⅜ inch deep and ½ inch wide in aluminum. Within the limiting range of values for each parameter, the depth and width of the metal preparation remain repetively constant for each combination of values, altho changeable for different combinations. Outside the limiting range, no combination of values will produce repetively constant results.

Changing the characteristics of the electrical supply, the plasma gas flow, and that of the shield gas will vary the size of the metal preparation and gouging but will also result in a loss of constancy charcteristics thereof for the same combination of parameters.

What is claimed is:

1. The method of pre-weld and post weld preparation of metal plate with plasma arc torch having a tip with cylindrical plasma passageway and comprising the steps of:
    (a) flaring outwardly the tip end of said cylindrical plasma gas passageway in an axial angle of divergence of 90 degrees plus or minus 10 degrees;
    (b) ionizing an inert gas in an arc stream between said tip and metal plate that responsive to said axle angle of divergence, forms a short thick plasma jet; and
    (c) passing said short thick plasma jet over said metal plate in any set comprising a wide range of working parameters, ie work angle, speed of travel, standoff, power density and gas flow, for producing stabilized gouges in said metal plate, the consistency of said stabilized gouges being dependent on said axial angle of divergence as limited in said top plasma passageway, and the physical dimensions of said gouges being dependent on said working parameters.

* * * * *